United States Patent
DeJonge et al.

(10) Patent No.: US 8,244,466 B2
(45) Date of Patent: Aug. 14, 2012

(54) METHOD AND SYSTEMS FOR REQUIRED TIME OF ARRIVAL PERFORMANCE DISPLAY

(75) Inventors: Michael Kent DeJonge, Caledonia, MI (US); Joel Kenneth Klooster, Grand Rapids, MI (US)

(73) Assignee: GE Aviation Systems, LLC, Grand Rapids, MI (US)

( * ) Notice: Subject to any disclaimer, the term of this patent is extended or adjusted under 35 U.S.C. 154(b) by 841 days.

(21) Appl. No.: 12/261,182

(22) Filed: Oct. 30, 2008

(65) Prior Publication Data

US 2010/0114406 A1  May 6, 2010

(51) Int. Cl.
  *G01C 21/10* (2006.01)
(52) U.S. Cl. .............................. 701/465; 701/467; 701/3
(58) Field of Classification Search .................. None
  See application file for complete search history.

(56) References Cited

U.S. PATENT DOCUMENTS

| | | | | |
|---|---|---|---|---|
| 2,646,924 | A * | 7/1953 | Schuck | 701/204 |
| 4,774,670 | A * | 9/1988 | Palmieri | 701/204 |
| 5,121,325 | A * | 6/1992 | DeJonge | 701/123 |
| 5,365,449 | A * | 11/1994 | Kashiwazaki | 701/208 |
| 5,408,413 | A * | 4/1995 | Gonser et al. | 701/204 |
| 5,459,666 | A | 10/1995 | Casper et al. | |
| 5,724,243 | A * | 3/1998 | Westerlage et al. | 455/456.5 |
| 6,571,155 | B2 | 5/2003 | Carriker et al. | |
| 6,885,313 | B2 | 4/2005 | Selk, II et al. | |
| 7,302,318 | B2 * | 11/2007 | Gerrity et al. | 701/16 |
| 7,571,049 | B2 * | 8/2009 | Kelly | 701/204 |
| 7,756,632 | B2 * | 7/2010 | Wise et al. | 701/204 |
| 8,010,267 | B2 * | 8/2011 | Klooster et al. | 701/66 |
| 2003/0139876 | A1 | 7/2003 | Shinagawa | |

FOREIGN PATENT DOCUMENTS

WO  2007053636 A1  5/2007

OTHER PUBLICATIONS

An International Search Report, dated Jan. 25, 2010, from the International Searching Authority for co-pending International Application No. PCT/US2009/062164 (3 pages).

* cited by examiner

*Primary Examiner* — Helal A Algahaim
(74) *Attorney, Agent, or Firm* — David J. Clement, Esq.; Armstrong Teasdale LLP (57) ABSTRACT

A method and system for a required time of arrival (RTA) performance graphic display is provided. The system includes a processor programmed to receive a required time of arrival and a first visual display communicatively coupled to the processor. The first visual display includes an RTA graphic having a dial substantially symmetric about an axis, a first marker indicative of a current estimated time of arrival (ETA) at a predetermined waypoint, a second marker indicative of a value of the RTA relative to the current ETA value and a selected RTA time tolerance value, a first indication representing a first time the vehicle can attain the predetermined waypoint, a second indication representing a last time the vehicle can attain the predetermined waypoint, a third indication representing the uncertainty of the ETA in an early arrival direction, and a fourth indication representing the uncertainty of the ETA in a late arrival direction.

20 Claims, 5 Drawing Sheets

METHOD AND SYSTEMS FOR REQUIRED TIME OF ARRIVAL PERFORMANCE DISPLAY

BACKGROUND OF THE INVENTION

This invention relates generally to vehicle navigation and guidance systems and, more particularly, to a method and systems for displaying a performance of a vehicle for meeting required times of arrival.

At least some known vehicles, most notably aircraft, are controlled to arrive a specific positions along a track at corresponding predetermined times. Such required time of arrival control permits increasing the air traffic using common airspace. In current operation, flight crews can monitor Required Time of Arrival (RTA) compliance by looking at numeric displays on the Control Display Unit that is mounted in the center pedestal area. However, numeric displays outside the pilot's forward field of view are difficult to read and interpret without increased effort by the pilot.

BRIEF DESCRIPTION OF THE INVENTION

In one embodiment, a system for a required time of arrival (RTA) performance graphic display includes a processor programmed to receive predetermined parameters associated with a required time of arrival and a first visual display communicatively coupled to the processor. The first visual display includes an RTA graphic having a dial substantially symmetric about an axis, a first marker indicative of a current estimated time of arrival (ETA) at a predetermined waypoint, a second marker indicative of a value of the RTA relative to the current ETA value and a selected RTA time tolerance value, a first indication representing a first time the vehicle can attain the predetermined waypoint, a second indication representing a last time the vehicle can attain the predetermined waypoint, a third indication representing the uncertainty of the ETA in an early arrival direction, and a fourth indication representing the uncertainty of the ETA in a late arrival direction.

In another embodiment, a method of displaying a required time of arrival (RTA) performance includes receiving waypoint information, including waypoint position information, a required time of arrival (RTA) of a vehicle at the waypoint, a tolerance about the RTA, and an estimated time of arrival (ETA) at the waypoint, and graphically displaying the RTA relative to the ETA.

In yet another embodiment, a forward field of view display system including a graphic display screen is provided. The graphic display screen includes a plurality of indicating areas, at least one indicating area includes a required time of arrival (RTA) display indicator configured to graphically display a current estimated time of arrival (ETA) at a predetermined waypoint, graphically display a value of the RTA relative to the current ETA value and a selected RTA time tolerance value, and graphically display a first time the vehicle can attain the predetermined waypoint using the fastest current speed limits of the vehicle. The RTA display indicator is further configured to graphically display a last time the vehicle can attain the predetermined waypoint using the slowest current speed limits of the vehicle, and graphically display an uncertainty of the vehicle being able to reach the waypoint within the selected RTA time tolerance value.

BRIEF DESCRIPTION OF THE DRAWINGS

FIGS. 1-7 show exemplary embodiments of a method and systems described herein.

DETAILED DESCRIPTION OF THE INVENTION

The following detailed description illustrates embodiments of the invention by way of example and not by way of limitation. It is contemplated that the invention has general application to analytical and methodical embodiments of determining a performance of a vehicle with respect to an arrival at a predetermined waypoint and to display the performance ergonomically in a convenient field of view of the vehicle operator in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Generally, aircraft are controlled in three dimensions; latitude, longitude and altitude. There has been extensive operational experience in three dimensions as evidenced by advances made in Required Navigation Performance (RNP). Display of navigation performance for flight crews has been developed so that compliance with applicable RNP is readily visible and appropriate alerting is provided when operation is not in compliance with the applicable RNP.

Controlling aircraft in the fourth dimension, time, is recently becoming more prevalent. Advances in airspace management show increased capacity for more aircraft when a landing time for each aircraft is specified in advance and each aircraft can control its arrival at waypoints along its track to its assigned time. Economic benefits also result if each aircraft can determine its desired landing time using its most fuel optimum flight profile. By specifying the landing time close to the desired landing time each aircraft saves fuel as well as increasing the capacity to land more aircraft. This method of operation is called Required Time of Arrival (RTA).

A method for displaying the time control performance in the forward view uses a "clock" type display containing a graphical view of the important parameters for monitoring RTA compliance during flight. It is compact enough to be placed in the pilot's primary field of view as a separate instrument. In the modern flight deck, the display can be incorporated as a graphic image on the primary flight display. An along-track "RTA time box" is added to the horizontal situation display when in the map mode.

Figure 1:
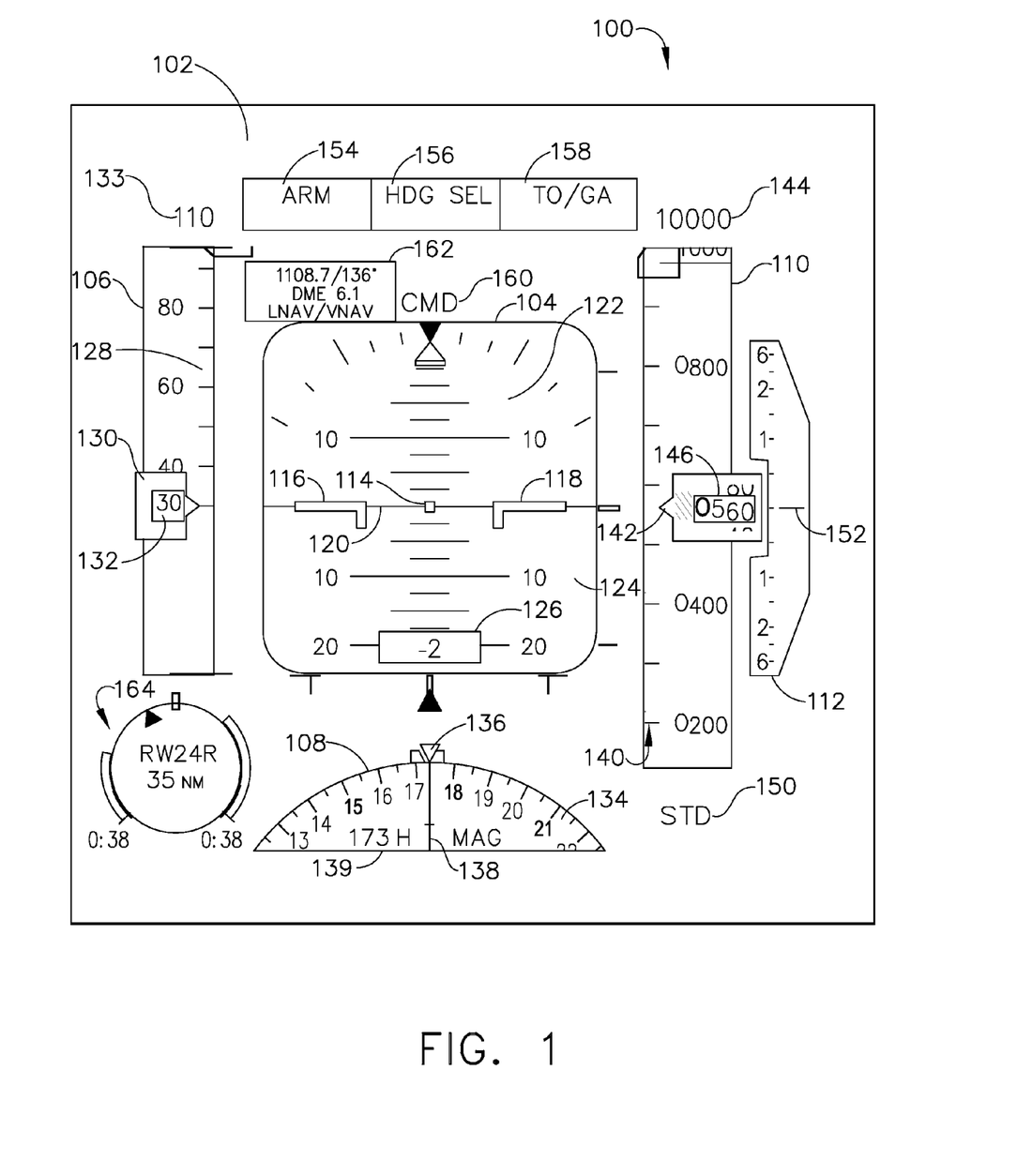
FIG. 1 is a graphic display in accordance with an exemplary embodiment of the present invention.

FIG. 1 is a graphic display 100 in accordance with an exemplary embodiment of the present invention. In the exemplary embodiment, display 100 is a primary flight display (PFD) that may be found in a cockpit (not shown) of an aircraft (not shown). Also in the exemplary embodiment, display 100 comprises a display field 102 presented on, for example, a cathode ray tube (CRT) screen, solid state display screen, or other display screen capable of functioning as described herein. Display field 102 is controlled by a display processor (not shown in FIG. 1) to display for example, but not limited to text, graphics, animations, icons, and soft keys. In various embodiments, display 100 comprises a touch-enabled screen.

Display field 102 is divided into a plurality of indicators or indicating areas 104, 106, 108, 110 and 112. A first area 104 comprises a centrally located electronic attitude indicator which is substantially rectangular in shape having a central boresight box 114 representing the airplane longitudinal axis at the center of boresight box 114. On either side thereof are conventional, stationary aircraft symbols 116 and 118. An artificial horizon is provided by line 120 between an upper more lightly shaded area 122 representing the sky and a lower darker area 124 for ground shading. In addition, area 124 includes a digital readout 126 of the radio or (radar) altitude, which displays the current height of the aircraft above the ground.

Adjacent and along a left hand side of attitude indicator 104 is an air speed indicator 106 comprising a vertically oriented movable scale 128 or "tape" having graduations representing air speed values along the right hand side thereof, i.e., on the side adjacent attitude indicator 104. Air speed indicator 106 further includes a fixed pointer 130 which points inwardly toward air speed scale 128 as well as toward a center of attitude indicator 104. Pointer 130 is provided with a window 132 digitally indicating the air speed in response to instrumentation of the aircraft. As the air speed changes, scale 128 moves vertically relative to pointer 130 which continues to point toward boresight box 114. Scale 128 presents a range of speed values above and below the current. The current value of the selected air speed is numerically displayed at location 133 above the air speed presentation.

Heading indicator 108 comprises a raster-shaded area having the shape of a segment of a circle or compass rose which is easily comprehensible by the viewer. Heading indicator 108 is provided with a degree scale along an upper, arc-shaped portion thereof adjacent to the attitude indicator 104, and like the previously described air speed indicator 106, a scale 134 of heading indicator 108 moves with respect to a fixed pointer 136. Below fixed pointer 136, heading indicator 108 includes a track indicator 138 that moves as the track varies in relation to the heading. To the left of pointer 136 is a location 139 that digitally displays the present heading.

Altitude indicator 110 is located adjacent a right hand side of attitude indicator and is provided with an altitude scale 140 along a left hand side thereof adjacent attitude indicator 104. Altitude indicator 110 is further provided with altitude numerics to the right of appropriate indicia on the scale. Altitude indicator 110 is of the moving scale type wherein scale 140 moves with respect to a fixed pointer 142 as the altitude of the aircraft changes, with the current value of the selected altitude being numerically displayed at location 144 above altitude indicator 110. Fixed pointer 142 includes an adjacent window 146 within which the correct altitude is digitally displayed in rolling number fashion. Thus, as altitude information from aircraft instrumentation changes, both the numerical indicia in window 146 and the position of the underlying scale 140 change accordingly. A digital readout at position 150 at a lower end of altitude indicator 110 represents the barometric setting in inches of mercury.

Display field 102 also includes vertical speed indicator 112 calibrated in thousands of feet per minute along the left hand side thereof adjacent altitude indicator 110. The shaded area comprising vertical speed indicator 112 is approximately trapezoidal in shape, widening toward altitude indicator 110, and is provided with a movable pointer 152 adapted to indicate the current vertical speed of the aircraft by pointing to the indicia of the scale along the left hand side of vertical speed indicator 112.

Display field 102 also includes flight mode annunciator readouts 154, 156 and 158 at the top center of the display. The three columns are reserved for autothrottle status, lateral mode status and vertical mode status. Flight director, autopilot, and autoland status annunciations are displayed at location 160 immediately above the attitude indicator center. In addition, location 162 includes characteristics of the approach, including station frequency and runway heading (in degrees), Distance Measuring Equipment (DME) readout in nautical miles and the current mode status.

Figure 2:
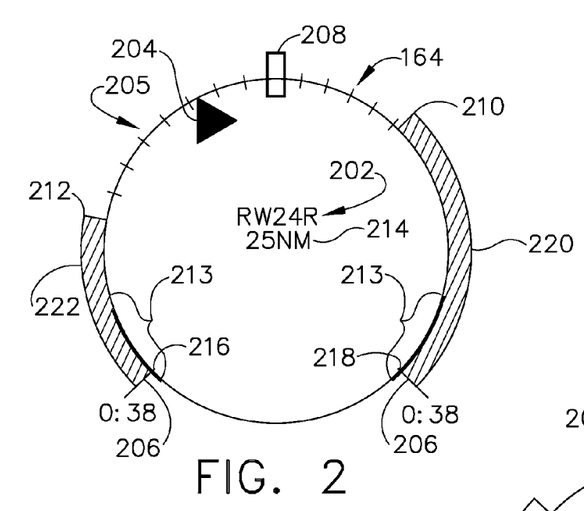
FIG. 2 is a display of the RTA graphic shown in FIG. 1 in accordance with an exemplary embodiment of the present invention.

Display field 102 further includes a Required Time of Arrival (RTA) graphic 164 positioned in a lower left hand corner of display field 102. RTA graphic 164 is used for displaying the time control performance of the aircraft in the forward view and uses a "clock" type display as is illustrated in FIG. 2. Although a clock-type display is illustrated in this non-limiting example, other linear or arcuate display types are also envisioned. RTA graphic 164 includes a graphical view of the important parameters for monitoring RTA compliance during flight. RTA graphic 164 is only visible on display field 102 when an RTA mode is active and engaged. In the exemplary embodiment, RTA graphic 164 is compact enough to be positioned in the pilot's primary field of view as a separate instrument.

FIG. 2 is a display of RTA graphic 164 in accordance with an exemplary embodiment of the present invention. In the exemplary embodiment, RTA graphic 164 includes an RTA waypoint name display 202 that may be crew entered or uplinked from another system or location. The waypoint corresponds to a position when a required crossing time is specified. An RTA time indicator 204 may be crew entered or uplinked and displays the required crossing time expressed in for example, hours:minutes:seconds GMT on a circumferential scale 205 of graphic 164. An RTA tolerance 206 at each end of scale 205 corresponds to an allowable plus and minus crossing time tolerance that is considered to be on-time expressed in minutes:seconds. A current ETA display 208 represents a computed estimated time of arrival at RTA waypoint 202. A first time display 210 represents a computed earliest time of arrival using the fastest allowable speed within aircraft limits. First time display 210 is represented by a bar that extends from RTA tolerance 206 towards current ETA display 208 a distance that changes as aircraft speed limits change. A last time display 212 represents a computed latest time of arrival using the slowest allowable speed within aircraft limits. Last time display 212 is represented by a bar that extends from RTA tolerance 206 towards current ETA display 208 a distance that changes as aircraft speed limits change. An estimated ETA uncertainty 213 represents a computed value of two times the standard deviation of an ETA estimation error yielding a 95% confidence level. Estimated ETA uncertainty 213 is represented on graphic 164 as a bolded band extending circumferentially from approximately RTA tolerance 206 on each side of graphic 164 toward current ETA display 208 a distance equal to the value of estimated ETA uncertainty 213. A distance to RTA waypoint 214 represents a computed along track distance to reach RTA waypoint 202.

Current ETA display 208 is shown at the top center of the "clock" dial. The scale of the dial shown by a first scale line 216 at a minus 120 degrees from current ETA display 208 and a second scale line 218 at a plus 120 degree position and is determined by the time tolerance allowed for RTA operation. This is equal to RTA tolerance 206 which may be equal to a crew-entered or uplinked RTA tolerance value adjusted for distance to RTA waypoint display 214. The scale has a maximum value of plus and minus 120 seconds when the distance to go is large and deceases to the plus and minus crew-entered or uplinked RTA tolerance value 206 when the distance becomes small.

RTA waypoint name display 202 is shown in the center of RTA graphic 164. Just below the name, distance to RTA waypoint 214 is displayed. RTA time indicator 204 is shown as a colored "bug", for example, a filled triangular symbol that rotates around the dial according to its value relative to current ETA display 208 and plus and minus RTA tolerance 206. The position of RTA time indicator 204 is positioned at the along-track waypoint location in the time domain relative to the fixed dial which represents the aircraft's predicted time at the top center of the scale. Reading the dial from left to right, the time behind the aircraft is on the left and the time ahead of the aircraft is on the right. As shown in FIG. 2, current ETA display 208 is slightly ahead of RTA time indicator 204 indicating that the aircraft is slightly early but well within RTA tolerance 206 at the ends of the scale.

Bars 220 and 222 around the dial represent first time display 210 and last time display 212, respectively that the aircraft can make at RTA waypoint display 202 as determined by the aircraft operating limits. Bars 220 and 222 are only displayed when such time falls within the current ETA display 208 plus or minus RTA tolerance 206. When it is no longer possible to achieve current ETA display 208 plus or minus RTA tolerance 206 without exceeding the speed limits of the aircraft, bars 220 and 222 are not displayed.

During operation, upon entering a value for RTA waypoint 202, the operator is prompted with RTA time indicator 204 equal to the predicted ETA using the default cost-optimal flight profile. This is the desired time of arrival using minimum cost profile for flight. The operator can change the prompted value by entering a new value that may be assigned by air traffic control. The resulting RTA speed target is provided as the active speed command to the autopilot and displayed on the primary flight display. The target speed may he overridden by any applicable speed restriction. The restricted speed is taken into account when computing the estimated time of arrival. By following the active speed command, the aircraft should achieve the RTA if it is within the aircraft speed limits to do so.

Figure 3:
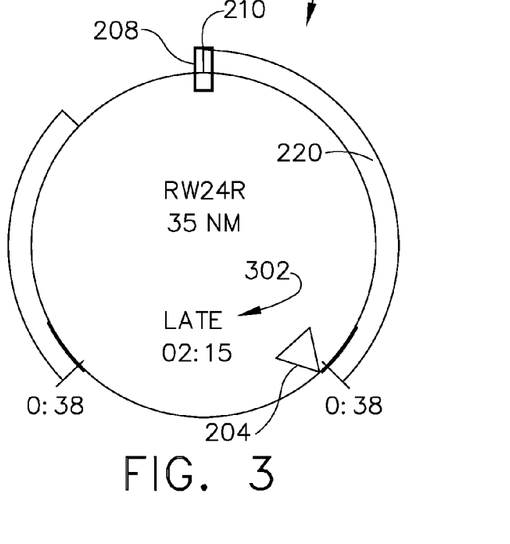
FIG. 3 is a display of the RTA graphic shown in FIG. 1 illustrating the RTA time indicator shown in FIG. 2 outside of an RTA tolerance.

FIG. 3 is a display of RTA graphic 164 illustrating RTA time indicator 204 is outside of RTA tolerance 206. In the exemplary embodiment, the triangular symbol RTA of time indicator 204 is parked just outside the full scale indication on the "late" side of RTA graphic 164. To alert the operator of this condition, the triangular symbol changes from a filled color symbol to an unfilled symbol and flashes for 10 seconds. A text message area 302 displays LATE if the triangular symbol is parked on the right of the scale and EARLY if the triangular symbol is parked on the left side of the scale. The amount of noncompliance is also shown in text message area 302 in the format hours:minutes:seconds.

Figure 4:
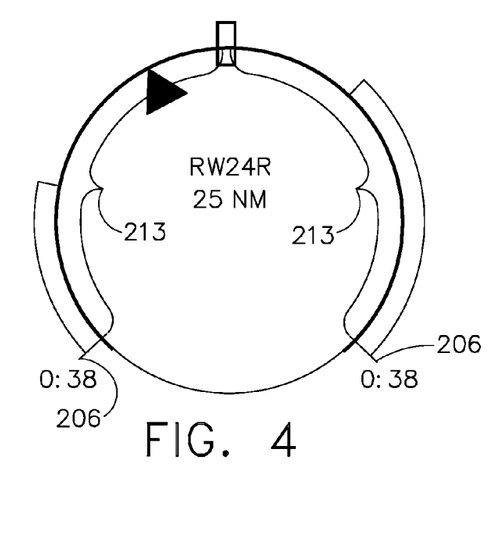
FIG. 4 is a display of the RTA graphic shown in FIG. 1 illustrating an increased estimated ETA uncertainty.

FIG. 4 is a display of RTA graphic 164 illustrating an increased estimated ETA uncertainty 213. Current ETA is computed based on current aircraft conditions and the forecasted conditions along the remaining flight path. There are a number of possible errors in the prevailing conditions used to compute ETA that result in some uncertainty. For example the horizontal position uncertainty has an along track component that directly translates into time of arrival uncertainty. Another example is the uncertainty of the forecast wind data ahead of the aircraft. Given the error models for each of the factors that contribute to ETA computation error, it is possible to compute a composite ETA uncertainty. The ETA uncertainty is the total error within which the computed ETA is contained with 95% probability. Typically this is two times the standard deviation of the ETA uncertainty.

In the exemplary embodiment, estimated ETA uncertainty 213 is increased relative to RTA tolerance 206, accordingly the bolded bands representing estimated ETA uncertainty 213 fill in the dial until the arcs bands in the middle, change to a predetermined color and flash for 10 seconds. As shown in FIG. 4 the bolded bands extend in a substantially continuous arc from the start to the end of scale 205 indicating that it is no longer possible to meet the RTA time constraint within 95% probability due to high ETA uncertainty.

Figure 5:
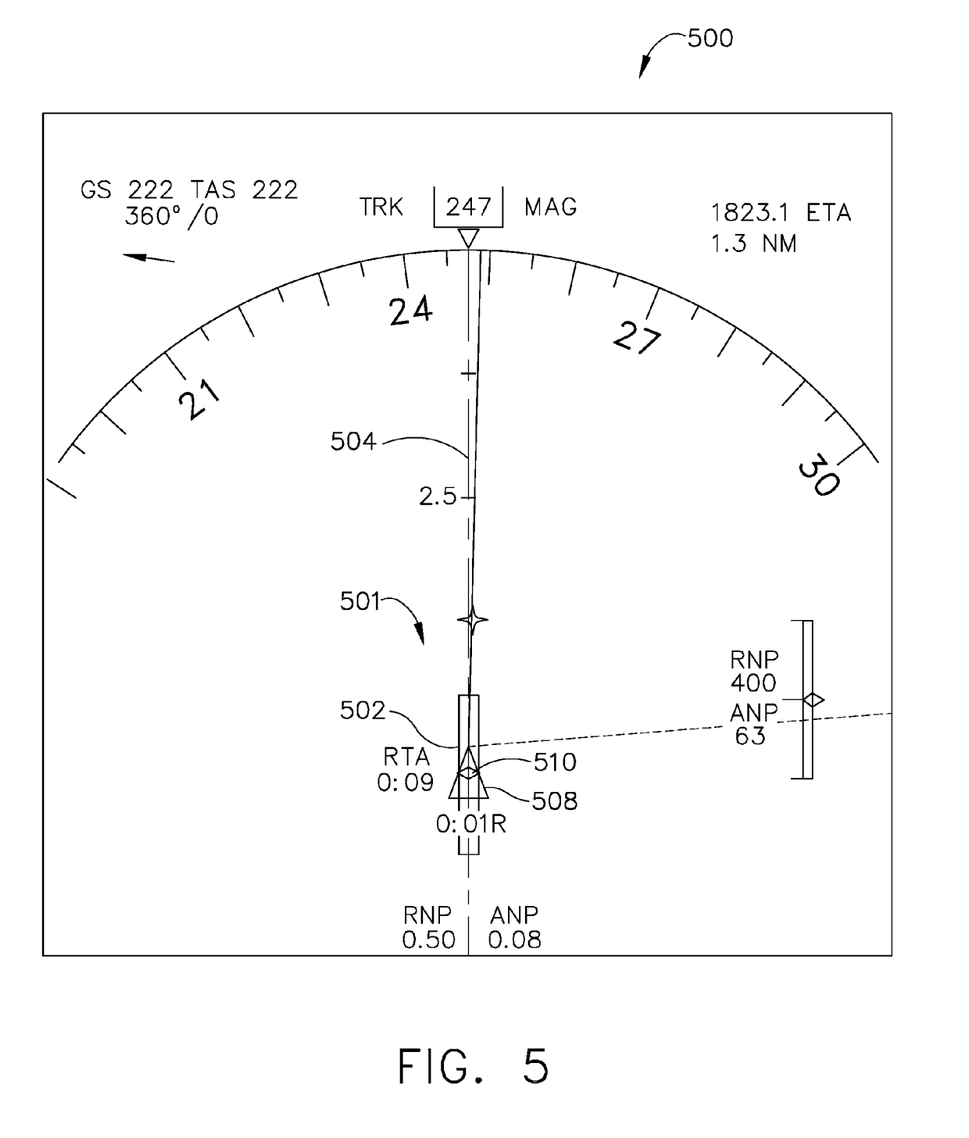
FIG. 5 is a view of a horizontal situation display shown in a map mode in accordance with an exemplary embodiment of the present invention.

FIG. 5 is a view of a horizontal situation display 500 shown in a map mode in accordance with an exemplary embodiment of the present invention. In the exemplary embodiment, a map display 501 of the RTA performance scale is displayed proximate a center of horizontal situation display 500 along a lubber line 504 of an aircraft icon 508. Map display 501 includes an along-track RTA time box 502 and a current ETA diamond 510 representing current ETA display 208. The relative positions of RTA time box 502, aircraft icon 508, and current ETA diamond 510 and the size of RTA time box 502 represents a graphical indication of the RTA performance of the aircraft in real time. RTA time box 502 and current ETA diamond 510 are only visible when the RTA mode is engaged and active.

Figure 6:
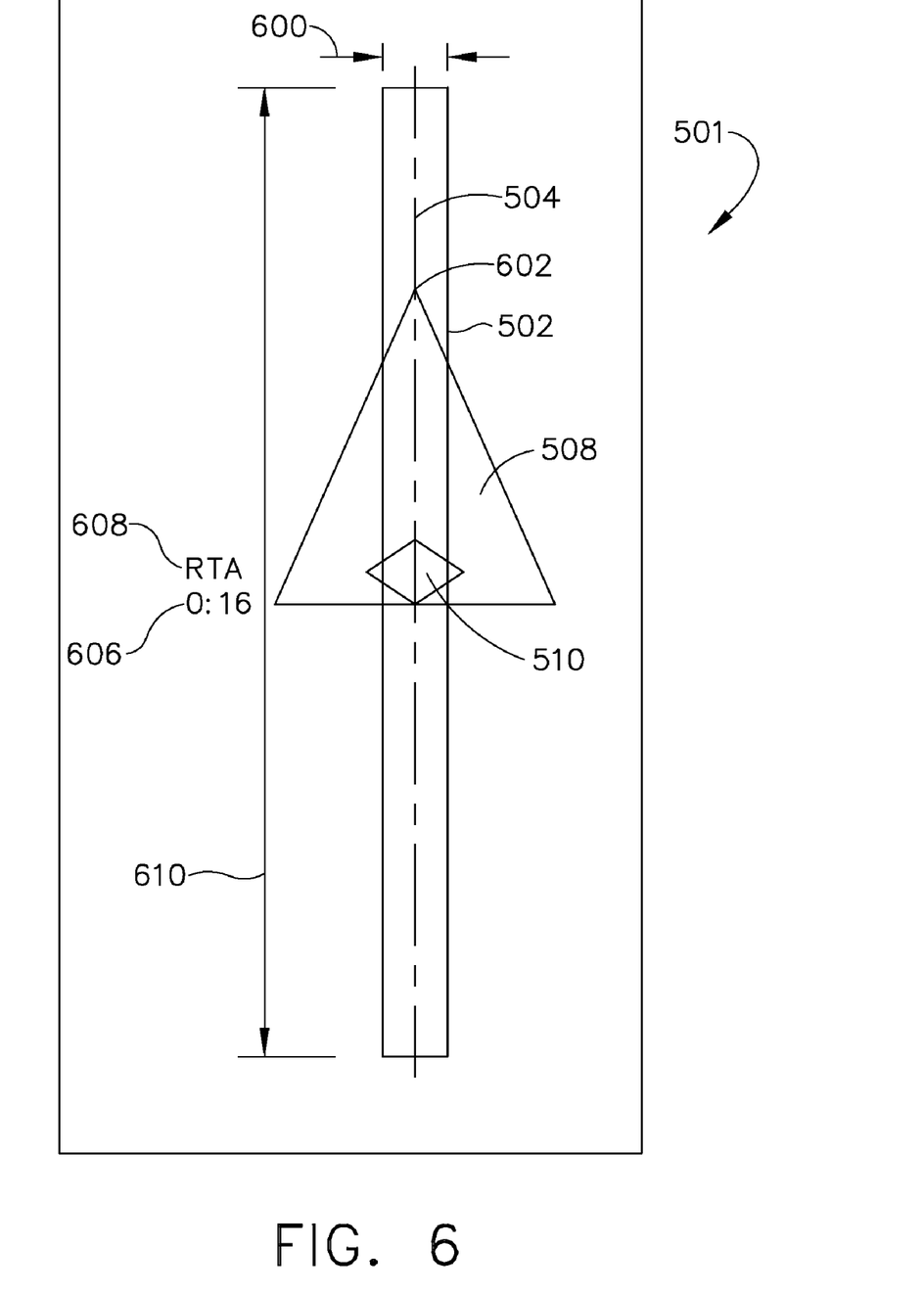
FIG. 6 is an enlarged expanded view of a portion of the horizontal situation display shown in FIG. 5 in accordance with an exemplary embodiment of the present invention.

FIG. 6 is an enlarged expanded view of a portion of a horizontal situation display 500 in accordance with an exemplary embodiment of the present invention. Map display 501 of is shown on horizontal situation display 500 when horizontal situation display 500 is in the map mode. Because the scale of the map is based on the geographic distance selected by the operator, the location, and along-track size of RTA time box 502 is converted to distance by multiplying time by ground speed. A width 600 of RTA time box 502 is fixed on the display. The nose of the aircraft, noted by the upper vertex 602 of aircraft icon 508, corresponds to current ETA display 208. At the center of RTA time box 502 is a current ETA diamond 510 that corresponds to a value of RTA time indicator 204. The center of RTA time box 502 is located at a distance of (current ETA display 208–RTA time indicator 204)*Ground Speed ahead of or behind the nose of the aircraft. The position of current ETA diamond 510 represents the desired along-track waypoint location in the time domain relative to the nose of the aircraft which represents the aircraft's ETA at that location. The difference, RTA–ETA is shown under the header RTA 608 adjacent to RTA time box 502 to indicate a time error 606 in hours:minutes:seconds.

RTA tolerance 206 is used to compute a length 610 of RTA time box 502 along the aircraft's track. Length 610 is determined by multiplying RTA tolerance 206 by ground speed. As long as the nose of the aircraft represented by upper vertex 602 of aircraft icon 508 is within the RTA time box, the aircraft is on time.

When RTA time indicator 204 is outside of RTA tolerance 206, the nose of the aircraft represented by upper vertex 602 of aircraft icon 508 is outside RTA time box 502 and the RTA time error 606 turns an amber color for example, alerting the operator that RTA time indicator 204 is outside of RTA tolerance 206. An example of a LATE condition would show RTA time box 502 ahead of the aircraft.

Figure 7:
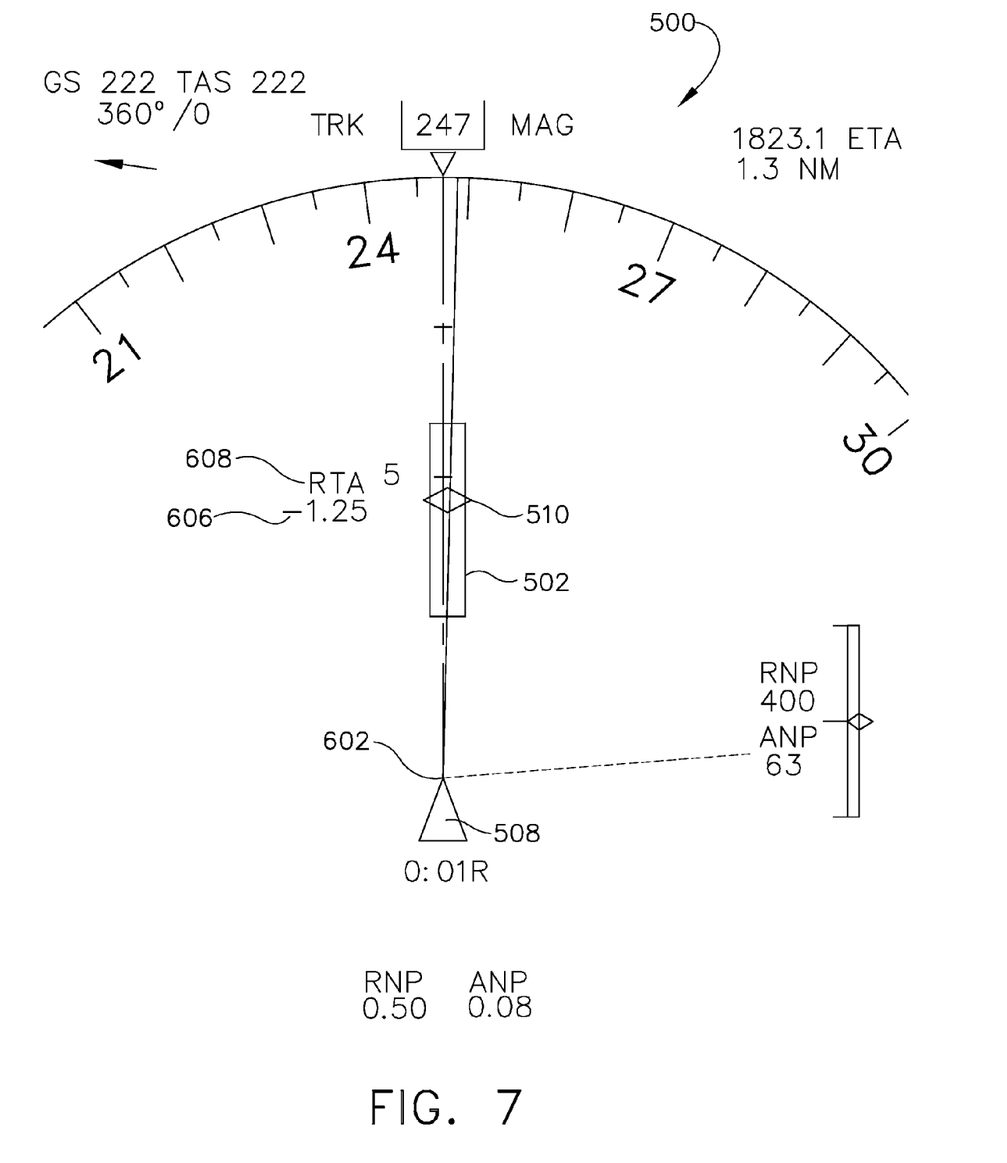
FIG. 7 is a view of the horizontal situation display shown in the map mode indicating an out-of-tolerance condition.

FIG. 7 is a view of horizontal situation display 500 shown in the map mode indicating an out-of-tolerance condition. In the exemplary embodiment, the nose of the aircraft, represented by vertex 602, is outside RTA time box 502, RTA time error 606 and header 608 turn amber alerting the operator that the RTA time is outside of the time tolerance. An example of the LATE condition is shown where RTA time box 502 is ahead of the aircraft represented by aircraft icon 508.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is providing a vehicle operator a graphic forward field of view display that indicates a performance of the vehicle with respect to an arrival of the vehicle at a predetermined waypoint at a predetermined time. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and systems of displaying a required time of arrival (RTA) display for a vehicle provides a cost-effective and reliable means for implementing a software enhancement to existing equipments in modern aircraft such as but not limited to the Flight Management Computer System (FMCS) and Cockpit Display System (CDS). More specifically, the methods and systems described herein facilitate receiving information relating to a vehicle position in time and space with respect to a predetermined waypoint position and a required time of arrival at the waypoint. In addition, the above-described methods and systems facilitate displaying the RTA information to the vehicle operator ergonomically in a forward field of view. As a result, the methods and systems described herein facilitate operating vehicles in a cost-effective and reliable manner.

While the disclosure has been described in terms of various specific embodiments, it will be recognized that the disclosure can be practiced with modification within the spirit and scope of the claims.

What is claimed is:

1. A required time of arrival (RTA) performance graphic display system for a vehicle, said system comprising:
    a processor programmed to receive predetermined parameters associated with a required time of arrival;
    a first visual display communicatively coupled to said processor, said display comprising an RTA graphic comprising:
        a dial comprising an axis;
        a first marker indicative of a current estimated time of arrival (ETA) at a predetermined waypoint;
        a second marker indicative of a value of the RTA relative to the current ETA value and a selected RTA time tolerance value
        a first indication representing a first time the predetermined waypoint is attainable by the vehicle;
        a second indication representing a last time the predetermined waypoint is attainable by the vehicle;
        a third indication representing the uncertainty of the ETA in an early arrival direction; and
        a fourth indication representing the uncertainty of the ETA in a late arrival direction, and
    a second visual display communicatively coupled to said processor, said second display comprising a map mode graphic comprising:
        an RTA time box comprising a length indicative of a relative time between the first time and the last time;
        a vehicle symbol including an indicia corresponding to the current ETA; and
        an RTA symbol indicative of a time the vehicle is required to cross a predetermined waypoint.

2. The RTA display system in accordance with claim 1 wherein said dial is substantially symmetric about an axis.

3. The RTA display system in accordance with claim 1 wherein said first visual display comprises an aircraft horizontal situation display.

4. The RTA display system in accordance with claim 1 wherein said map mode graphic is aligned with a lubber line of the vehicle on a horizontal situation display.

5. The RTA display system in accordance with claim 1 wherein the length of the RTA time box represents a distance along the vehicle track using the first time and last time multiplied by the ground speed of the vehicle.

6. The RTA display system in accordance with claim 1 wherein a difference between the indicia and the RTA symbol represents a difference between the vehicle ETA at the waypoint and the RTA at the waypoint.

7. The RTA display system in accordance with claim 1 wherein an indication of the indicia positioned outside of the RTA time box represents at least one of an early arrival condition and a late arrival condition.

8. The RTA display system in accordance with claim 1 wherein said first visual display comprises an aircraft primary flight display.

9. The RTA display system in accordance with claim 1 wherein said dial comprises a scale graduated in units of time.

10. The RTA display system in accordance with claim 1 wherein said first marker is positioned at the center of the dial.

11. The RTA display system in accordance with claim 1 wherein the first indication comprises a first bar indication extending from a first limit of the dial towards said first marker and wherein the second indication comprises a second bar indication extending from a second limit of the scale towards said first marker.

12. The RTA display system in accordance with claim 1 wherein the third indication comprises a third bar indication extending from the first limit of the scale towards said first marker and wherein the fourth indication comprises a fourth bar indication extending from the second limit of the scale towards said first marker.

13. A method of displaying a required time of arrival (RTA) performance comprising:
receiving waypoint information, including waypoint position information, a required time of arrival (RTA) of a vehicle at the waypoint, a tolerance about the RTA, and an estimated time of arrival (ETA) at the waypoint; and
graphically displaying on a first electronic visual display the RTA relative to the ETA indications representing times the predetermined waypoint is attainable by the vehicle, and indications representing the uncertainty of the ETA; and
graphically displaying on a second electronic visual display, a map mode graphic comprising: an RTA time box comprising a length indicative of a relative time between a first time the wavpoint is attainable by the vehicle and a last time the waypoint is attainable by the vehicle, a vehicle symbol including an indicia corresponding to the current ETA; and an RTA symbol indicative of a time the vehicle is required to cross the waypoint.

14. The method of displaying a required time of arrival (RTA) performance in accordance with claim 13, further comprising graphically displaying an uncertainty of the ETA at the waypoint.

15. The method of displaying a required time of arrival (RTA) performance in accordance with claim 14, wherein the uncertainty of the ETA at the waypoint includes at least one of an along track component of a horizontal position uncertainty and an uncertainty due to forecast wind data ahead of the vehicle.

16. The method of displaying a required time of arrival (RTA) performance in accordance with claim 13, further comprising:
receiving a first time of arrival at the waypoint using a fastest allowable speed within limits of the vehicle;
receiving a second time of arrival at the waypoint using a slowest allowable speed within limits of the vehicle; and
graphically displaying the first and second times of arrival.

17. A forward field of view display system comprising a graphic display screen comprising a plurality of indicating areas, at least one indicating area comprising a required time of arrival (RTA) display indicator configured to:
graphically display on a map mode graphic:
a current estimated time of arrival (ETA) at a predetermined waypoint;
a value of the RTA relative to the current ETA value and a selected RTA time tolerance value;
a first time the predetermined waypoint is attainable by the vehicle using the fastest current speed limits of the vehicle;
a last time the predetermined waypoint is attainable by the vehicle using the slowest current speed limits of the vehicle; and
an uncertainty of the vehicle being able to reach the waypoint within the selected RTA time tolerance value, and a color-coded alert indicating whether the aircraft is outside of the selected RTA time tolerance value.

18. The forward field of view display system in accordance with claim 17 further comprising a scale graduated in units of at least one of time and distance.

19. The forward field of view display system in accordance with claim 17 wherein said graphic display screen comprises a horizontal situation display, said RTA display indicator comprising a vehicle icon representing a vehicle ETA and an RTA time box display, a relative position of the vehicle icon and the RTA time box display indicative of the vehicle RTA performance.

20. The forward field of view display system in accordance with claim 19 wherein said graphic display screen comprises a horizontal situation display, said RTA display indicator comprising an RTA symbol proximate a center of the RTA time box display a difference in relative position of the RTA symbol and said vehicle icon representing a time error of arrival at the predetermined waypoint.

* * * * *